No. 657,592. Patented Sept. 11, 1900.
H. DE WALLACE.
TRAIN ORDER SIGNAL.
(Application filed Jan. 29, 1900.)

(No Model.) 8 Sheets—Sheet 1.

FIG. 1.

WITNESSES.

INVENTOR
HARRY DE WALLACE
BY
HIS ATTORNEYS.

THE NORRIS PETERS CO., PHOTO-LITHO., WASHINGTON, D. C.

No. 657,592. Patented Sept. 11, 1900.
H. DE WALLACE.
TRAIN ORDER SIGNAL.
(Application filed Jan. 29, 1900.)

(No Model.) 8 Sheets—Sheet 2.

FIG. 2.

WITNESSES.

INVENTOR
HARRY DEWALLACE
BY
HIS ATTORNEYS.

No. 657,592. Patented Sept. 11, 1900.
H. DE WALLACE.
TRAIN ORDER SIGNAL.
(Application filed Jan. 29, 1900.)

(No Model.) 8 Sheets—Sheet 3.

WITNESSES.
E. G. Staude
Richard Paul

INVENTOR
HARRY DE WALLACE
BY Paul O Hawley
HIS ATTORNEYS

No. 657,592. Patented Sept. 11, 1900.
H. DE WALLACE.
TRAIN ORDER SIGNAL.
(Application filed Jan. 29, 1900.)

(No Model.) 8 Sheets—Sheet 4.

WITNESSES.
E. G. Stande
Richard Paul

INVENTOR
HARRY DE WALLACE
BY Paul & Hanly
HIS ATTORNEYS.

No. 657,592. Patented Sept. 11, 1900.
H. DE WALLACE.
TRAIN ORDER SIGNAL.
(Application filed Jan. 29, 1900.)

(No Model.) 8 Sheets—Sheet 5.

FIG. 6.

WITNESSES
E. G. Staude
Richard Paul

INVENTOR
HARRY DE WALLACE
BY Paul H Hawley
HIS ATTORNEYS

No. 657,592.

H. DE WALLACE.
TRAIN ORDER SIGNAL.
(Application filed Jan. 29, 1900.)

Patented Sept. 11, 1900.

(No Model.)

WITNESSES.

INVENTOR
HARRY DE WALLACE
BY Paul & Hawley
HIS ATTORNEYS.

No. 657,592. Patented Sept. 11, 1900.
H. DE WALLACE.
TRAIN ORDER SIGNAL.
(Application filed Jan. 29, 1900.)

(No Model.) 8 Sheets—Sheet 7.

WITNESSES

INVENTOR
HARRY DE WALLACE
BY
HIS ATTORNEYS.

No. 657,592. Patented Sept. 11, 1900.
H. DE WALLACE.
TRAIN ORDER SIGNAL.
(Application filed Jan. 29, 1900.)

(No Model.) 8 Sheets—Sheet 8.

WITNESSES
E. G. Staude
Richard Paul

INVENTOR
HARRY DE WALLACE
BY Paul H Hawley
HIS ATTORNEYS.

THE NORRIS PETERS CO., PHOTO-LITHO., WASHINGTON, D. C.

UNITED STATES PATENT OFFICE.

HARRY DE WALLACE, OF WATERTOWN, NEW YORK.

TRAIN-ORDER SIGNAL.

SPECIFICATION forming part of Letters Patent No. 657,592, dated September 11, 1900.

Application filed January 29, 1900. Serial No. 3,093. (No model.)

*To all whom it may concern:*

Be it known that I, HARRY DE WALLACE, of the city of Watertown, in the county of Jefferson, State of New York, (formerly of St. Paul, Minnesota,) have invented certain new and useful Improvements in Train-Order Signals, of which the following is a specification.

This invention relates to automatic means for employment upon trains, and particularly upon locomotives for signaling or reminding the engineer of his approach to another train, or to a station, or to a railroad-crossing, where his orders require him to stop or to slacken the speed of the train, or, in general, to execute any other order which may have been given to him.

The invention further relates to devices which not only automatically sound a signal, but also stop the train by applying the air-brakes in case the engineer neglects or fails to regard the signal. The invention relates particularly to improvements in the devices shown and described in Letters Patent issued to me January 3, 1899, No. 617,232; April 18, 1899, No. 623,503, and January 30, 1900, No. 642,303.

The object of my present invention is to simplify, improve, and lessen the cost of train-order signals such as are shown and described in my aforesaid patents.

In the accompanying drawings, forming part of my invention, Fig. 8 is a detail showing the connection of the train supply-pipe, the valve that is controlled by the signal mechanism, and the pop-valve controlling the exhaust of air from the device. Fig. 9 is an end view of the pop-valve looking in the direction of the arrow in Fig. 8. Fig. 10 is a plan view, and Fig. 11 is a side elevation, of one of the triggers.

In all of the drawings, 2 represents the base of the machine, which consists, preferably, of a circular metal casting adapted to support the various parts of the machine. Upon the base 2 I arrange a circular casing 3, preferably formed of sheet metal, and the case is completed by a front plate 4, which is also preferably of circular form. While I have shown and described the machine as of circular form, it will be understood that I do not limit myself to any particular form of the machine.

Secured upon the front plate 4 of the casing is the large dial 5, and arranged upon the dial is the ring or hollow standard 6. The small dial 7 and the central front plate 8 are arranged upon the ring 6, and I prefer to secure all of said parts to the plate 4 of the casing by means of the bolts 9, which pass through the plate 8, the dial 7, ring 6, the dial 5, and the front plate 4 and are provided at their inner ends with suitable nuts 10. Any other suitable means may, however, be used, if preferred, for properly securing these parts to the casing of the machine. It will be noted that the front plate 4, the dial 5, the dial 7, and the plate 8 all have central openings which are coincident with the central opening in the ring 6.

Mounted upon or secured to the base 2 is the two-part standard 11, forming bearings for the main driving-shaft 13, as hereinafter described. The upper or outer portions of the standards 11 are united and form the hollow cylindrical bearing or post 12, which extends beyond the front of the casing and partially through the ring or hollow standard 6. A tubular shaft 14 is mounted upon the cylindrical standard or bearing 12 and is provided with the flange 15 and the worm-wheel 16. The outer end of the tubular shaft 14 projects beyond the dial 7 and front plate 8, and the movable hand or pointer 17 is provided at its inner end with a ring which fits upon the end of the shaft 14 and is secured to said shaft by suitable set-screws 18 or other suitable means. It will be noted that the tubular shaft 14 is mounted upon the cylindrical standard or bearing 12 and that it is adapted to rotate in the space between said bearing and the inner surface of the ring 6.

Figure 3:
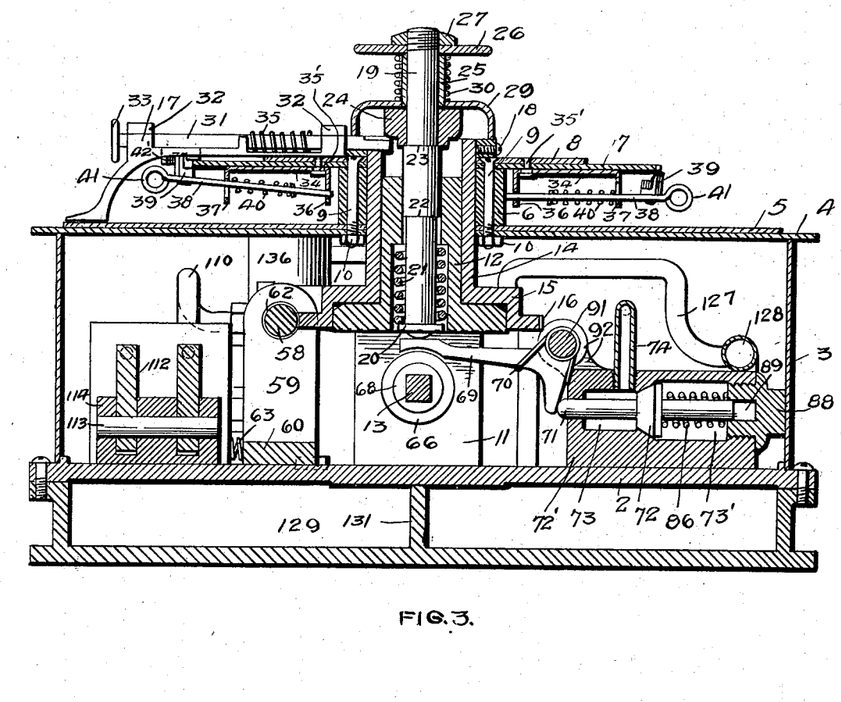
Fig. 3 is a section on line 3 3 of Fig. 2.
Figure 12:
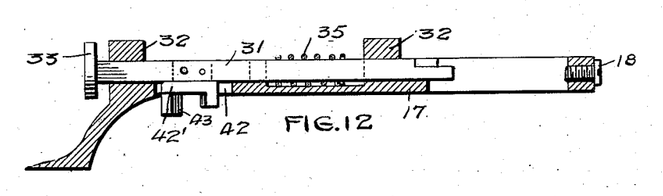
Fig. 12 is a partial section and partial side elevation of the movable hand.
Figure 13:
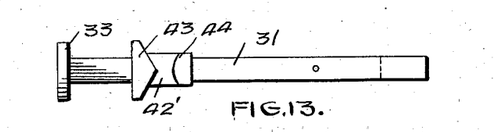
Fig. 13 is a plan view of the sliding catch and releasing device carried by the movable hand.
Figures 14, 15, 16:
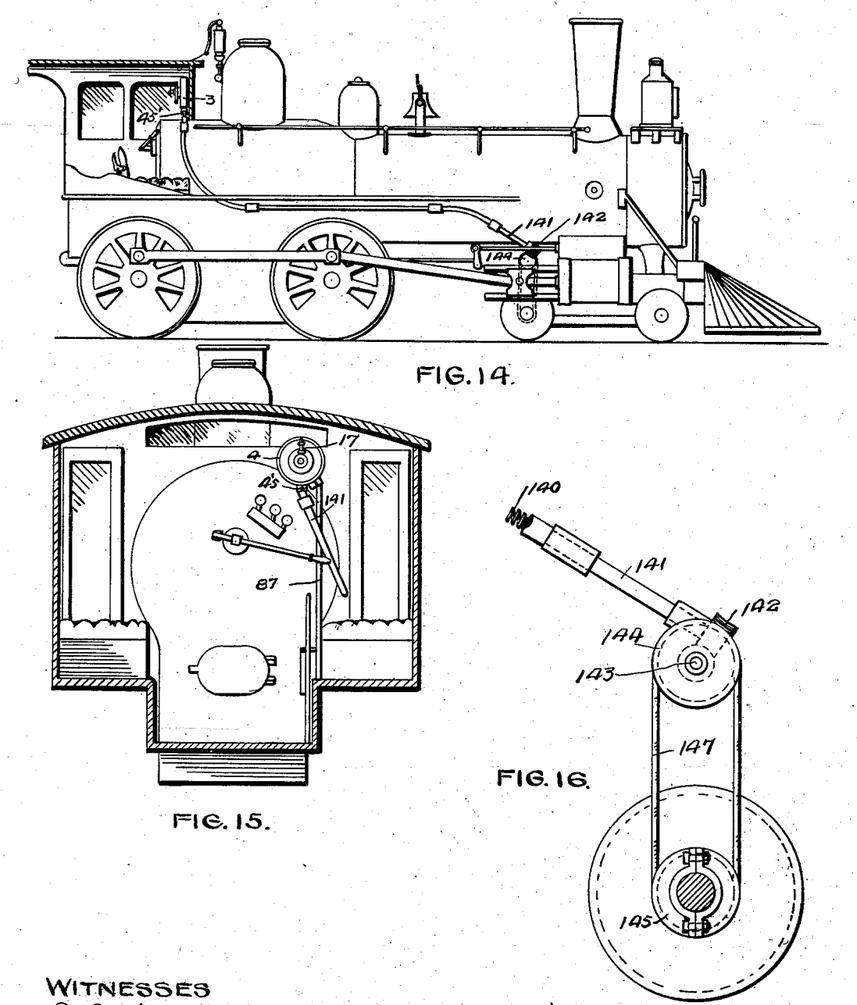
Fig. 14 is a side elevation of a locomotive, showing my train-order signal applied thereto.
Fig. 15 is a transverse section through the cab of the locomotive, showing arrangement of the train-order signal in the cab.
Fig. 16 is a detail showing one means for connecting the train-order signal to the trucks of the locomotive.

Passing centrally through the cylindrical standard 12 is a sliding plunger 19, provided at its inner end with a disk 20, which is secured to said plunger by a screw or other suitable device and which forms a shoulder or ledge around the end of said sliding plunger. A spring 21 surrounds the inner portion of the sliding plunger 19 within the cylindrical standard 12, the outer end of said spring bearing against a suitable shoulder formed in said standard. The plunger 19 is also provided with the shoulders 22 and 23, the part of the plunger between said shoulders fitting the bore of the standard 12, which serves as a guide for said plunger. I also provide a collar 24 upon the plunger 19 outside of the shoulder 23, and said collar is held in position by a sleeve 25, which bears on the top of the collar and the outer end of which is engaged by a disk 26, held in position upon the end of the plunger 19 by means of a nut 27. A dome-shaped plate 29 is arranged outside of the collar 24, with its edge resting upon the ring of the hand 17. A spring 30 surrounds the sleeve 25, one end bearing upon the disk 26 and the other upon the top of the dome 29, and thereby said dome is held closely against the surface of the ring of the hand 17, making a close joint therewith and excluding dust from the interior of the machine. The spring 21 is considerably stronger than the spring 30 and tends to move the plunger 19 inward. I provide means for locking this plunger in its outer position and holding it there, except when it is released for the purpose of operating the signal, as hereinafter set forth. The hand 17 is provided with the sliding latch or bolt 31. (See Figs. 12 and 13.) This bolt slides in bearings 32 upon said hand and is provided at its outer end with a knob or button 33. A spring 35 surrounds said bolt, engaging a pin thereon at one end and a shoulder on the hand at the other, and this spring tends to hold the bolt 31 inward or toward the center of the machine, whereby the inner end of the bolt engages the collar 24, (see Fig. 3,) and thereby holds the plunger 19 outward against the tension of the spring 21. I also provide in connection with one of the dials of the machine a series of triggers or latches similar in principle to those employed in the machines of my aforesaid patents, but arranged in a somewhat different manner. A series of shoes 34 are pivoted upon the back or rear side of the small dial 7. Any suitable number of these shoes may be employed. Each of these shoes is secured to the rear side of the dial 7 by any suitable means. I have here shown a pivot 35' employed as the means for securing each of said shoes to said dial. Each of said shoes is also provided with end portions 36 and 37, turned at right angles to the main part of the shoe and each provided with an opening forming a bearing for a sliding trigger 38. The opening in the part 37 of the shoe is preferably in the form of a slot, so as to permit the end of the trigger that is nearest the edge of the dial 7 to be moved outward, so as to cause the lug 39 on said trigger to engage the notched edge of the dial. The part of the trigger that passes through the slot in the swiveled shoe is preferably made with flat sides and is thus kept from turning or wabbling. A spring 40 surrounds said trigger, and one end of said spring bears against a pin on the trigger and the other end against the swiveled shoe. The end of the trigger is formed with a loop 41, which permits the insertion of the end of the finger of the operator and which enables him to draw out the trigger against the tension of its spring and to engage the lug 39 on said trigger with the notched edge of the dial. I prefer in constructing the triggers to blank them out of small rods or strips of metal, so that the ends of the rods that are to form the loops will be square or rectangular in cross-section. The loops are then formed, and the inner edge of the loop will present a square corner or edge at each side of the loop, which will cling to the finger and thumb of the operator when it is gripped, so that the trigger may be readily lifted and drawn out or swung around for setting. The full loop of the trigger, even when discharged and at rest, preferably extends beyond the notched edge of the smaller dial, thus facilitating the operation of the trigger.

When a trigger is to be set, it is drawn out by the engineer or operator, and the lug 39 thereon is engaged with one of the notches on the edge of the smaller dial. The mounting of the triggers upon the swiveled shoes permits any trigger to be engaged with any one of several notches. I also provide means whereby upon the passage of the movable hand over any trigger that is engaged with the notched dial the sliding bolt 31 on the hand will be moved to disengage the plunger 19, and at the same time the trigger will be released and disengaged from the dial. For this purpose the hand 17 is provided with a longitudinal slot 42, and a double lug 42' is secured upon the under side of the bolt 31 and projects through this slot. (See Fig. 12.) The lug 42' is provided with the double-inclined surface 43 and also with the double-inclined or curved surface 44. (See Fig. 13.) The lug 39 on the trigger is also provided with the double-inclined surfaces 45 and 46. (See Fig. 10.) As the hand travels around the dial when it passes over a trigger that is in engagement with the dial the lug 39 on the trigger is engaged by the lug 42', carried by the hand, and the movement of the hand over the trigger causes the bolt 31 to be drawn out of engagement with the collar 24 on the plunger 19. As soon as the bolt 31 is drawn out of engagement with the collar 24 the spring 21 forces the plunger 19 inward, causing the air-valve to be opened, as hereinafter described. It will be noted that the collar 24 is provided with a beveled edge at the outer portion of the shoulder that is engaged by the sliding bar 31, so that as the plunger 19 is forced inward the latch or bolt 31 is forced still farther outward than the plane of the trigger-point carries it, and this movement of the latch or bolt causes the inner part of the lug 42' to strike the point of the trigger hooked in the notch of the dial and force the same out of the notch. The upper surface of the point of the trigger is preferably rounded or beveled slightly, so as to permit the lug on the latch or bolt to engage said trigger and force it out of the notch in the dial. As soon as the trigger is thus freed from the dial-notch it moves inward away from the edge of the dial, where it remains at rest until again used for setting. It will be noted that the latch or bolt 31 is thus given two distinct movements. The first movement is caused by the engagement of the double-inclined inner surface of the outer part of the lug 42' with the point of the trigger. This movement releases the plunger 19 and permits the spring 21 to force said plunger inward. The engagement of the beveled edge of the collar 24 on the plunger as the plunger moves inward forces the latch or bolt 31 farther outward and causes said bolt to release the trigger from the notched edge of the dial. When the plunger is pulled outward by the engineer or attendant, which is done by grasping the disk or button 26, the bolt 31 is forced inward by the spring 35 and engaging with the collar 24 locks the plunger in its outer position. If the engineer desires at any time to sound the alarm or to cause the operation of the brake-setting parts without the setting of the triggers, he can grasp the button 33 on the bolt 31 and pull out said button, and thereby move said bolt, so as to cause it to disengage the collar 24 on the plunger 19. The plunger will then be forced inward by its spring and will cause the operation of the signal and brake setting parts. It will be noted that the body of the hand 17 extends across the front of the small dial instead of passing between the two dials, as in my former patents, and that the point of the hand is bent down until it almost touches the larger dial 5 and that the extreme point of the hand in its travel around the circle points to the graduations that are stamped in the outer edge of the large dial. The small dial 7, as here shown, is graduated and marked for the first hundred miles with mile graduations only. The large dial is graduated for fifths of miles and is numbered from "100" to "200."

Figure 1:
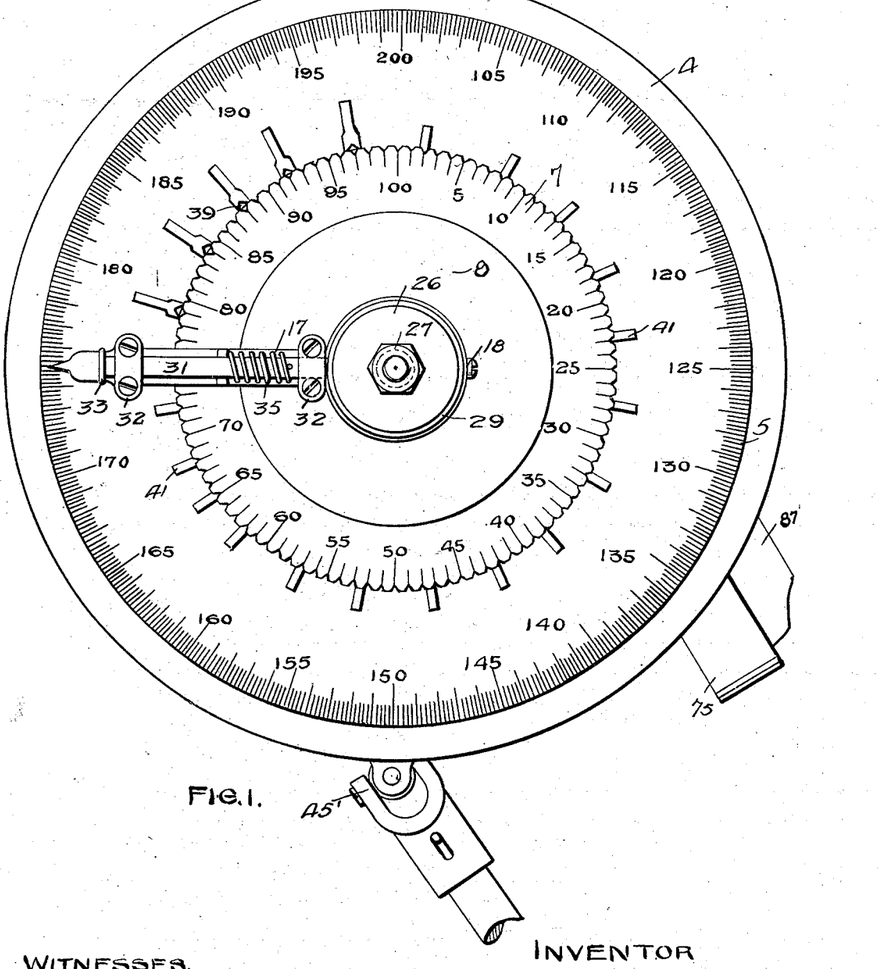
Figure 1 is a front or face view of a train-order signal embodying my invention.
Figure 2:
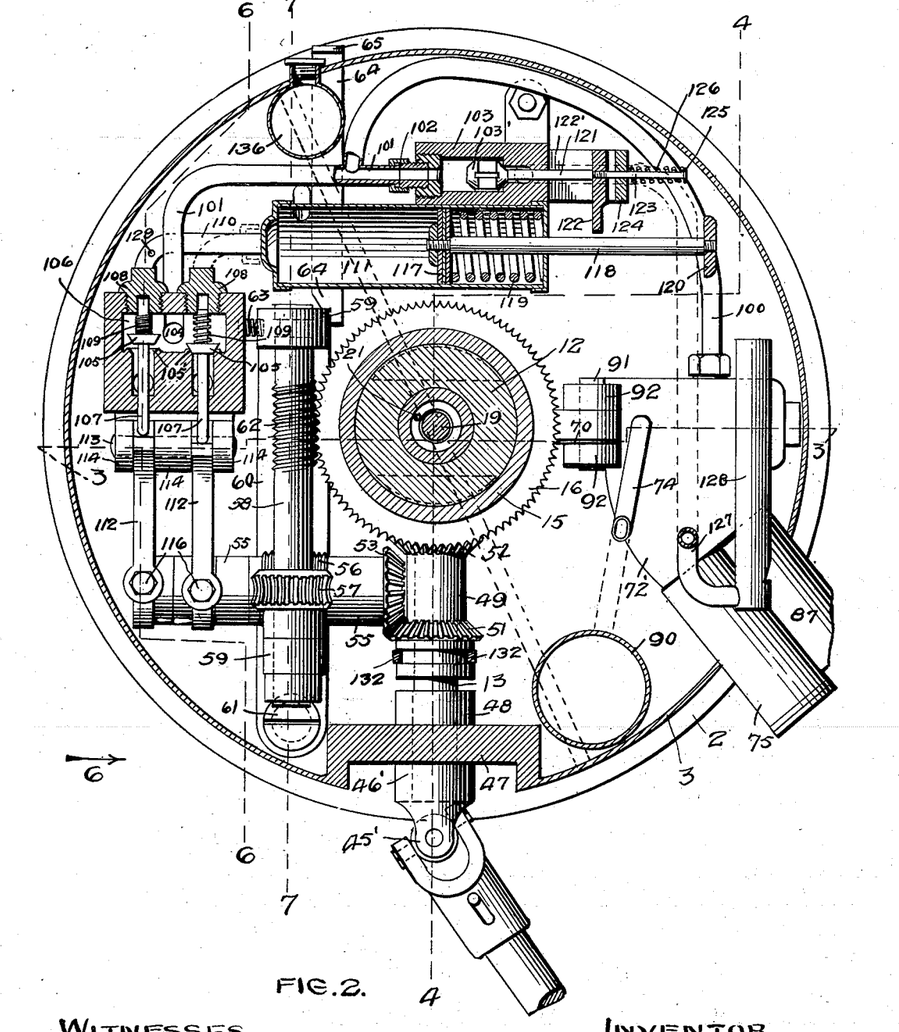
Fig. 2 is a vertical section on a plane parallel with the face of the machine.
Figures 4, 5:
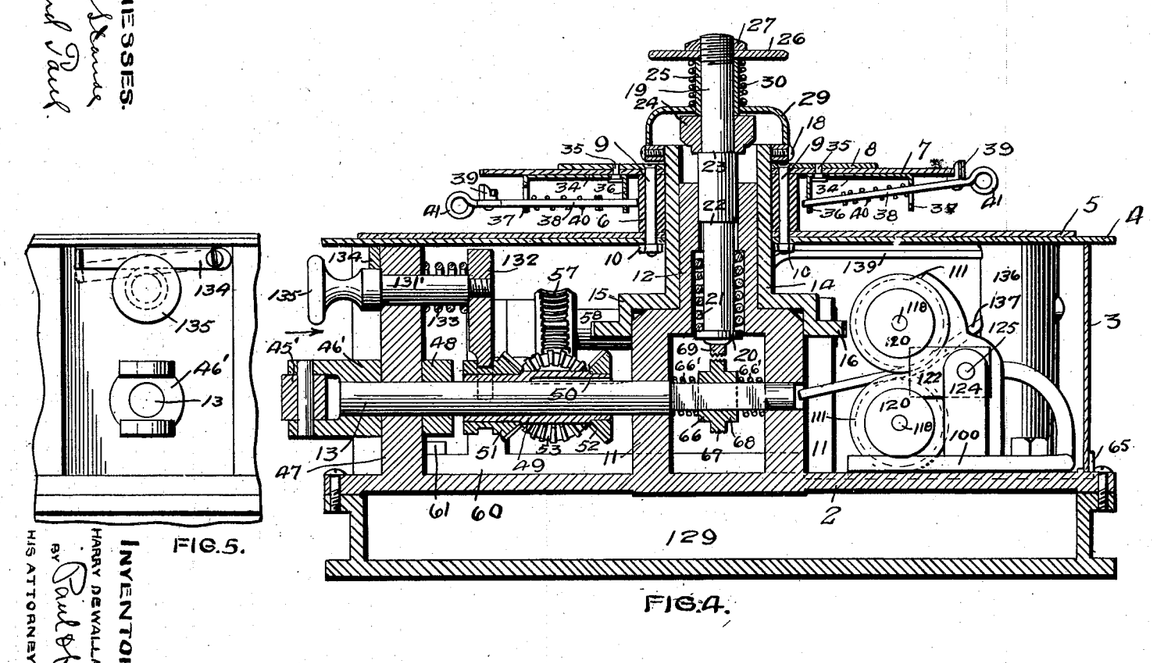
Fig. 4 is a section on line 4 4 of Fig. 2.
Fig. 5 is a detail looking in the direction of the arrow placed at the left of Fig. 4.
Figure 7:
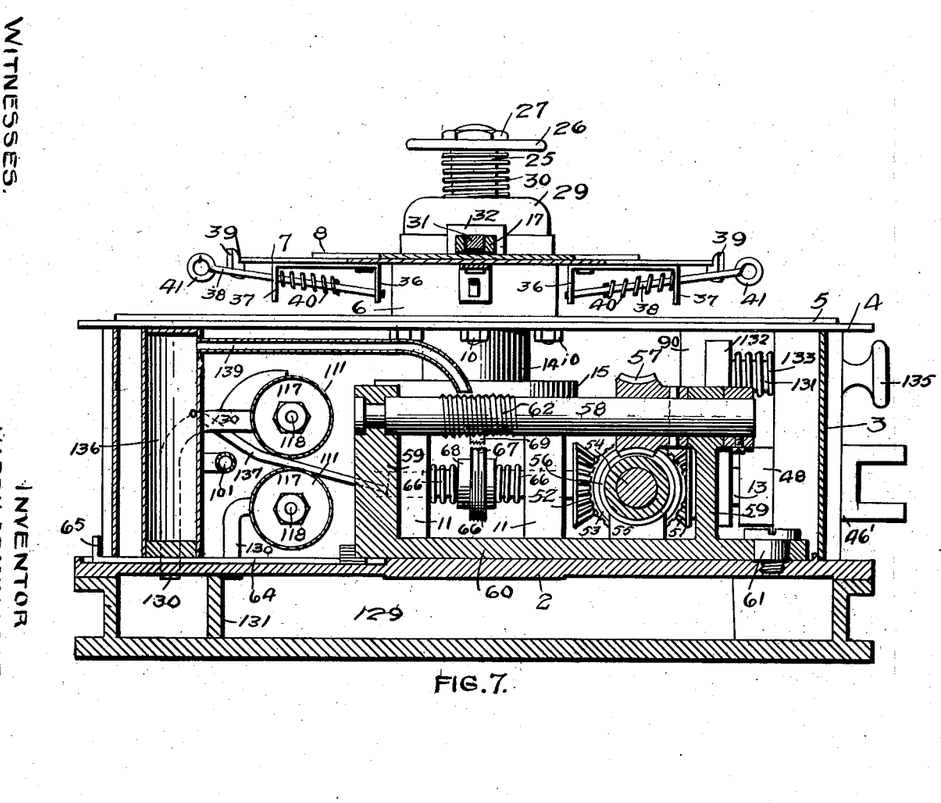
Fig. 7 is a section on line 7 7 of Fig. 2.
Figures 8, 9, 10, 11:
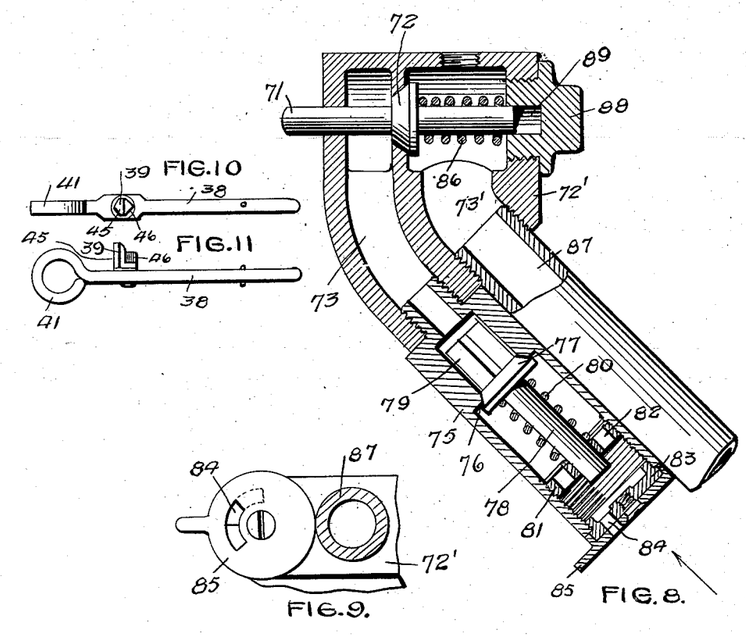

The main driving rod or shaft 13, which is provided outside of the casing with a universal joint 45' and sleeve 46', is mounted at its outer end in a suitable bearing 47 and at its inner end in the standards 11. The bearing 47 is formed upon or secured to the back plate 2 and preferably extends the full depth of the case and forms one of the supports of the face or front plate 4 of the case. As shown in Fig. 4, one member of the universal joint 45' is a sleeve secured upon the shaft 13, close to the bearing 47. A collar 48 is also arranged upon the shaft 13, inside of the bearing 47. By this means the shaft 13 is prevented from having any lengthwise movement. A sleeve 49 is arranged on the shaft 13 and is slidable thereon and is caused to rotate with said shaft by means of a feather or spline 50. The sleeve 49 carries the shifting miter-gears 51 52. The shaft 13 extends beyond the sleeve 49 and passes through both of the bearings 11, which bearings, in fact, constitute legs or footings of the center standard or bearing 12. The miter-gears 51 and 52 are secured to the sleeve 49, and they drive the miter-gear 53, which is secured to the worm-shaft 54, mounted in bearings 55, formed upon or secured to the face-plate 2. On the shaft 54 is also secured the worm 56, which drives the worm-gear 57, which is secured to a second worm-shaft 58, mounted in bearings or standards 59, that are formed upon or secured to a movable plate 60. The plate 60, which carries the standards 59, is preferably pivoted to the base-plate 2 by means of the screw or pivot 61. (See Fig. 7.) The worm-shaft 58 is provided with a worm 62, which engages the worm-wheel 16. (See Fig. 2.) The worm-wheel 16, as already stated, is secured upon the tubular shaft 14, which carries the movable hand 17. The plate 60, which carries the standard 59 of the worm-shaft 58, is, as already stated, pivoted upon the base 2 of the machine. A spring 63 (see Fig. 2) engages the standard located at the opposite end of the plate from the pivot 61, and this spring tends to hold the plate 60 in such position that the worm 62 is in engagement with the worm-wheel 16. A slide 64 is arranged to engage the end of the plate 60, the end of said slide being inclined or beveled, as shown in Fig. 2, and the opposite end of the slide is arranged outside of the casing and is provided with a finger-piece 65. When it is desired to disengage the worm 62 from the worm-wheel 16, the slide 64 is pushed inward and its inclined end coming in engagement with the pivoted plate 60 moves said plate against the tension of the spring 63, and thereby moves the worm 62 out of engagement with the worm-wheel 16.

The driving-shaft 13, as already stated, passes through both of the standards 11, forming the legs or footings of the central standard or bearing 12, and the portion of the shaft 13 which extends between these bearings 11 is made square or rectangular in cross-section. (See Figs. 3 and 4.) On this rectangular part of the shaft 13, within the arch formed by the standards 11 and the cylindrical standard 12, is placed the tripping-worm 66. This worm has a square hole through its center which fits the square part of the shaft 13 loosely, so that it is easily slidable on said shaft. The extreme diameter of this worm is the part 67, which has the worm-threads, and this threaded rim is in the center, and there is a plain shoulder 68 of less diameter on either side of the worm part. The crank-lever 69, which is shown with its longest arm directly over this worm, is intended to stand when at rest slightly above the worm-threads. There are also corresponding threads on the inner or under surface of the end of the crank-lever 69. The inner end of the plunger 19 when locked in position by the latch or bolt 31 on the hand 17 just touches the outer side of the crank-lever 69, which is held against the end of the plunger by the small coiled spring 70, which is supported by the pivot-pin on which the lever is hung. This spring lifts the lever out of engagement with the worm 66 as soon as the plunger is pulled out and locked. In operation when the plunger 19 is released, as is done when the hand 17 passes over a trigger, it shoots inwardly by the tension of the spring 21 and forces the threaded end of the crank-lever 69 into the threads of the worm 66. It only requires a slight movement of the crank-lever to cause a perfect mesh of the threads; but this slight movement of the lever causes the shorter arm of said lever which engages the outer end of the piston 71 of the signal and brake valve 72 to force this piston into the body of the valve just enough to slightly unseat the valve and permit a small amount of air-pressure from the train-pipe to rush into the exhaust-chamber 73 of the valve 72, to which the vent or tube 74, which supplies the signal-whistle, is connected, and the whistle begins to sound. A puppet-valve 75 is, in fact, the real exhaust for the air-pressure for the purpose of setting the brakes. This puppet-valve (shown in detail in Fig. 8) is set to open or close at a pressure of about forty pounds. The signal-whistle is constructed so that it will take about all of the air released through the valve 72 upon the first slight movement of the plunger 19 and the crank-lever 69, and the puppet-valve 75 acts as a sort of gate or dam, preventing the reduced pressure which is released through the valve 72 on its first slight opening from escaping to the atmosphere except through the signal-whistle, and this is done for the purpose of insuring the giving of a full and proper tone to the whistle during the interval of signal before the setting of the brakes occurs. The whistle continues to take all of the air released, therefore, from the time the valve 72 first opens and during the time it requires for the worm 66 to be carried along on the square portion of the shaft 13, which is constantly revolving, until the threaded rim of the worm is carried to one side or the other of the center of the arch far enough to allow the end of the crank-lever 69, the thread of which is in engagement with the thread of the worm, has caused the worm to travel longitudinally on the shaft 19 to drop down onto the plain shoulder 68 of the worm. On this last sudden and abrupt movement of the crank-lever 69, which is forced this additional distance by the plunger 19 and its spring 21, the short arm of the crank-lever, which is still bearing against the piston 71 of the signal and brake-valve 72, forces the piston in the full length of its travel, and this action opens the valve 72 wide and the full train-pipe pressure is released against the puppet-valve, which opens as the air-pressure from the train-pipe is about seventy pounds, while the puppet-valve is preferably set to open at any pressure above forty pounds. The air escapes through the puppet-valve and, reducing the pressure in the train-pipe, effects the setting of the brakes. The signal-whistle continues to blow continuously; but of course after the pressure increases the whistle becomes much more shrill. If the engineer or the attendant does not pull the plunger 19 out, the air-pressure continues to decrease, and when it is lowered to forty pounds the puppet-valve will close and prevent the air-pressure from being further reduced. The air-brakes become tightly set upon the release of ten or fifteen pounds of pressure if the reduction is made within a short space of time, and when once the brakes are set they will remain in that condition until the plunger is pulled out and the pumps connected to the air-brake system are enabled by the closing of the valve 72 to restore the air-pressure to the required standard, when the air-brakes will be released without any action by the engineer or without requiring the use of the engineer's valve. The puppet-valve is shown in detail in Fig. 8 of the drawings, and it serves two purposes: first, to compel all of the air on the first slight opening of the valve 72 to go to the signal-whistle, and, second, to prevent the unnecessary waste of air-pressure in the train-pipe below a safe limit required for the setting of the brake and the holding of the train in case for any reason no one is on duty to release or restore the signal device. The construction of puppet-valve which I have shown and which I prefer to use is as follows: The body of the puppet-valve is secured to the body of the valve 72 and connects with the exhaust-chamber 73. The puppet-valve body is provided with a conical seat 76, upon which the conical valve 77 is adapted to seat. 78 represents the valve-stem, and 79 wings arranged inside of and forming a part of the valve 77. There are preferably four of these wings arranged at right angles to each other, and they serve as guides for the valve. A coil-spring 80 surrounds the valve-stem 78, bearing at one end upon the valve 77 and at the other upon a follower 81, that is screwed into the end of the valve-body and is provided with a central opening for the valve-stem 78 and with a series of perforations 82 to permit the passage of the air. A cap 83 is screwed into the end of the valve-body and is provided with an opening 84 and with a pivoted plate 85, having an opening adapted to register with the opening 84. By adjusting the plate 85 the opening 84 may be entirely uncovered or may be wholly or partially closed. In practice the plate 85 is adjusted so that it will let a sufficient volume of air escape from the puppet-valve to set the brake, and this volume may be increased or decreased by the adjustment of said plate as desired, according to the number of cars in the train. By adjusting the follower 81 the tension of the spring 80 may be regulated. In practice I prefer to set the follower so that it will require about forty pounds of pressure to open the puppet-valve. The details of the puppet-valve which I have shown and described are illustrated clearly in Figs. 8 and 9 of the drawings. It will be understood, however, that I do not limit myself to any particular construction of puppet-valve, as the same may be varied in many ways without departing from my invention.

The valve-body 72' of the air-brake valve may be cast integrally with the base-plate 2, or it may be formed separately and secured thereto in any suitable manner. This valve-body and the construction of the valve are shown clearly in Figs. 3 and 8 of the drawings. As here shown, the valve-body is provided with the two chambers 73 and 73', between which is a conical valve-seat upon which the valve 72 is adapted to be seated by a spring 86, which surrounds the rear end of the piston or valve-stem 71. The train-pipe 87 is connected to the valve-body 72' and communicates directly with the chamber 73'. The valve-body is provided with a threaded opening through which the valve may be inserted, and this opening is closed by a plug 88, having a socket 89, adapted to receive the end of the stem or piston 71. The spring 86 bears upon the valve 72 and also against the end of the plug 88. When the plunger 19 is drawn out, the valve 72 is closed by means of the spring 86, assisted by the pressure of the air in the chamber 73'. As the plunger is drawn out the crank-lever 69 is also restored to its normal position, with its end resting against the inner end of the plunger, by means of the spring 70, and the tripping-worm 66 is restored to its normal position in the center of the space between the bearings 11 11 by means of the springs 66', which are arranged upon the shaft 13 between the sides of the worm and the bearings 11. These springs are so adjusted that they hold the worm 66 substantially in the center of the space between the bearings 11, ready to be moved in either direction on the shaft 13 when the crank-lever is engaged with the worm. If preferred, the springs 66' may be so adjusted as to cause the worm 66 to stand normally slightly at either side of the center of the space between the bearings 11, thereby increasing or decreasing the time of contact of the end of the lever 69 with said worm, and thereby regulating the time that the whistle will be sounded before the air-valve 72 is opened wide to permit the setting of the brakes. If the plunger 19 is released while the locomotive or train is standing still, then the lever 69 will only be forced down into the threads of the worm 66, but this slight movement will cause the valve 72 to open sufficiently to blow the signal-whistle as long as the valve is thus held open and the train-pipe is charged with air under pressure. The brakes are not set, however, unless the train is moving and the worm 66 is carried by the rotation of the shaft 13 from under the end of the crank-lever 69. The worm 66 is constructed and placed in such position that it will operate the same whether the train is traveling forward or backward. The only difference is that if the train is traveling in one direction the end of the crank-lever will drop down at one side of the worm, and if the train is traveling in the other direction it will drop down at the other side of the worm. The signal-whistle 90 is connected to the chamber 73 by a pipe 74. The whistle may be of any suitable construction, and it is preferably arranged within the casing and secured to the base-plate 2. An opening may be formed in the wall of the casing opposite the whistle to permit the escape of the air passing through the whistle to the atmosphere.

The crank-lever 69, heretofore described, is preferably pivoted by a pin 91 in the lugs 92, which are preferably cast on the upper edge of the valve-body 72'. The spring 70 is arranged on the pin 91 and engages the lever 69 and holds the end of the lever against the end of the plunger 19.

The mechanism already described constitutes the train-order-signal and air-brake-setting mechanism. It is found, however, to be desirable to provide in connection with this mechanism a disorder-signal that will show whenever the train-order signal has gotten out of order or when anything has happened to it, so that it cannot be relied upon to perform the duty required of it. In my Patent No. 617,232, issued January 3, 1899, I have shown and described a disorder-signal of this character and for this purpose. In the machine herein shown and described I have shown an improved construction of the disorder-signal, which renders the same absolutely certain and positive.

Figure 6:
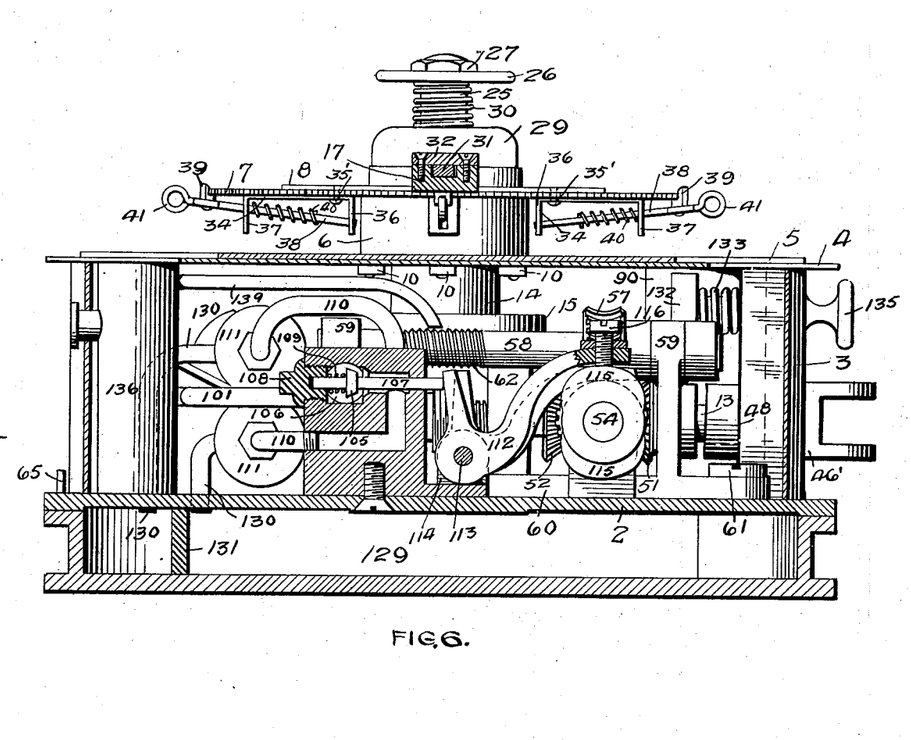
Fig. 6 is a section on line 6 6 of Fig. 2 looking in the direction of the arrow marked 6 on said figure.

To the chamber 73' of the air-brake valve there is connected a small tube 100, which carries the air under pressure to the tube 101 and which connects at the end 102 with the disorder-alarm valve 103, and at the other end 104 it connects with the common chamber 106 of the twin valves 105. In the chamber 106 there are two reciprocating valve stems or pistons 107, which carry the valves 105. The ends of these valve-stems pass through the valve-body, and their opposite ends are adapted to enter sockets in the plugs 108, that are screwed into the threaded openings in the valve-body. Each of said valve-stems is provided with a suitable spring 109. The valve-body is provided with a suitable valve seat 105' for each valve 105, and tubes 110 connect with the valve-body on the other side of the valves from the chamber 106. (See Figs. 2 and 6.) The tubes 110 also connect with the piston-cylinders 111. These cylinders are alike in construction and operation, but are actuated alternately by pulsations of air-pressure permitted to pass from the chamber 106 by the alternate movement of the valves 105. The valves 105 are operated by the crank-levers 112, which are pivoted on the pin 113, having bearings in lugs 114, which are preferably cast upon the body containing the valve-chamber 106. (See Fig. 6.) The short arms of the crank-levers engage the ends of the valve-stems 107 and the long arms of the levers ride upon and are operated by the cams 115, which are secured to and are driven by the shaft 54. These cams are oppositely placed upon the shafts 54, so that they have an alternating action upon the valve-stem. Each crank 112 is preferably provided with a screw 116, which bears upon the surface of the cam (see Fig. 6) and by means of which the throw of the lever and the movement of the valve-stem and valve may be adjusted. It will be observed from the shape of the cams 115 that there will be a short interval of time in each half-revolution of the shaft 54, and therefore of the cams, when both of the valves 105 will be closed—that is to say, the crank-levers will be free from the outer ends of the valve-stems. This arrangement is made in order to prevent the stoppage of the main signal-operating parts at any point and leaving both of the valves partly open and preventing the return of the cylinder-piston to cause the disorder-alarm to be given. Each of the cylinders 111 is provided with a piston 117 and with a piston-rod 118, extending through the end of the cylinder opposite that to which the tube 110 is connected, and a spring 119 is provided in each cylinder surrounding the piston-rod 118 and bearing upon the piston. A button 120 is provided on the outer end of each piston-rod 118. The function of the spring 119 is to force the piston in when the pressure is wanting or is too weak to compress the spring and is therefore too weak to hold the button 120 on the outer ends of the piston-rods from opening the disorder-alarm valve, as hereinafter described. The disorder-alarm valve is located at one side of the cylinder 111 and consists of a valve 103', that is arranged to reciprocate in the valve-chamber 103. (See Fig. 2.) As before stated, the tube 101 is connected by suitable coupling to the end of the valve-chamber 103, and the valve 103', which is provided with a conical plug at each end and with suitable ducts between said plugs, is arranged in the valve-chamber 103 and is adapted to be seated at either end thereof. The valve 103' is provided with a valve-stem 121, that passes through the end of the valve-chamber and is provided with the cross-head 122. Forming a continuation of the valve-stem 121 is the rod 123, which passes through a standard 124 and is provided at its end with a button 125. A spring 126 surrounds the rod 123, one end of the spring bearing against the button 125 and the other against the standard 124. A tube 127 is connected to the valve-chamber 103 at the opposite end of the chamber from that at which the pipe 101 is connected, and the tube 127 is connected to the disorder-whistle 128.

It will be seen that the air in the tube 100, in the tube 101, and in the valve-chamber 103 is always under the same pressure as the air in the train-pipe, these parts being connected directly to the chamber 73', that is in direct communication with the train-pipe. As each of the valves 105 is opened by the rotation of the shaft carrying the cams 115, the air passes through the tube 110 to the corresponding cylinder 111 and forces back the piston 117 against the tension of the spring 119, and thereby moves the button 120 away from the cross-head 122. When the valve 105 closes, the air in the corresponding cylinder is forced out of the cylinder by the force of the spring 119. Provision is made for the leaking or slow escape of the air from the cylinder as said spring expands. For this purpose I may provide a small hole 129 in each of the tubes 110, or I may permit a slight leakage of air around each valve-stem 110. The valve 103' will stand normally in the position shown in Fig. 2 of the drawings, being seated at the end of the valve-chamber which has the connection with the disorder-alarm. This valve will be held normally in this position by a spring 126 and the force of the air-pressure upon the opposite end of the valve. When one of the valves 105 is opened, as before stated, the compressed air passing through the tube 110 and entering the corresponding cylinder 111 forces the piston 117 back in the cylinder, compresses the spring 119 and moves the button 120 as far as possible from the cross-head 122. As shown in Fig. 4 of the drawings, this cross-head is adapted to be engaged by either of the buttons 120. Upon the closing of the valve 105, as before stated, the air is forced slowly out from the cylinder 111, escaping through the opening 129 or around the valve-stem 107. The piston 117 travels along in the cylinder, and if the pressure is not restored in the cylinder by the opening of the valve 105 the button 120 upon the piston-rod comes in contact with the cross-head 122 and moving said cross-head unseats the valve 103'. The air immediately passes around said valve and passing through the tube 127 blows the whistle 128. This whistle I term the "disorder" signal or alarm. If the locomotive or train is running, before the piston 117 travels far enough to bring the button 120 into contact with the cross-head 122 the valve 105 will be again opened and the air reëntering the cylinder will force back the piston. Either one of the pistons may move the cross-head 122, and thereby unseat the valve 103'. So long, however, as the engine or train is running, except at a very low speed, the valves 105 will be opened in quick succession, and the piston 117 will be held back in the cylinders with the piston-rods projecting from the cylinders substantially their full length, and before either piston can travel far enough to cause the operation of the disorder-signal the valve will have opened again and the piston will be again forced back in the cylinder. The springs 119 in the cylinders 111 are strong enough, either one of them, to overcome the spring 126 of the alarm-valve stem 121 and also the pressure of the air against the valve 103' and to move the valve 103' the full length of its stroke. It requires in practice from forty to fifty pounds of pressure to force the cylinder-pistons out the full distance they may travel. The normal position of the valve 103' is that shown in Fig. 2 of the drawings, where it is represented as seated at the right-hand end of the valve-chamber, and thereby closing the pipe leading to the disorder-alarm whistle. When one of the buttons 120 engages the cross-head 122 and moves said cross-head, the valve 103' immediately becomes unseated at that end of the valve-chamber, and as it travels along in the valve-chamber very slowly the air which is admitted to the valve-chamber through the tube 101 under full pressure passes around the valve 103', through the grooves or ducts in the body thereof, and enters the tube 127 and passes to the disorder-alarm whistle 128. When the valve 103' has been moved the full length of the valve-chamber by the action of the button 120, the air is shut off from the disorder-alarm whistle by the final seating of the valve 103' at the other end of the valve-chamber. The disorder-alarm whistle therefore only sounds during the interval of time required for the valve 103' to open and close, as just described, and the double seating of this is rendered necessary in order to withhold the alarm when everything is working right or working at all, and also to shut off the alarm after it has been sounded long enough to give the desired warning. The disorder-alarm whistle, for convenience, is here shown as secured to the body of the brake-valve, and its sound is heard through a small opening made in the metal casing which incloses the device.

I prefer to provide a bracket 122', (see Fig. 2,) arranged in such position that the cross-head 122, attached to the valve-stem 121, slides on said bracket. This bracket affords a bearing for the cross-head and for the valve-stem for the purpose of steadying the movement of the valve and causing it to be seated perfectly at the end of its movement. The bracket also prevents the cross-head from turning or cramping in its travel, and by this means the valve-stem is caused to move out and in freely without binding.

The introduction of the twin valves 105 makes it necessary to employ a separate cylinder for each of the valves. Much better results are obtained from this double arrangement than from the single-valve device of my patent of January 3, 1899. It is not very likely that both of the valves 105 or both of the cylinders 111 will ever fail, if they do at all, at the same time. If one valve or one cylinder should fail and the other one be in working order, the one valve and its cylinder will operate the disorder-alarm signal in case of a failure of the main signal device, unless the train is moving so slowly that its movement can scarcely be noticed. It will be noted that reciprocating valves are used throughout the device and that the air-pressure is utilized to assist the springs in seating the valves. When the valves are once caused to seat tightly, there is practically no wear upon them and there is little chance of their becoming leaky. In operating the valves I employ crank-levers to force the valves back against the pressure of their spring and the air and hold them there until the object of their workings has been attained, and then they are allowed to close themselves. The leverage of the crank-levers is generally about two to one, which permits of providing the valve-stems with strong springs to insure positive seating.

I have also found it desirable to provide an auxiliary reservoir in connection with each of the cylinders 111, which has practically the same effect in the operation of the device as the use of larger cylinders would have. For this purpose I provide two reservoirs 129 in the rear of the base-plate 2 of the machine, and I connect one reservoir to each cylinder by means of a pipe 130. These reservoirs are preferably formed in a supplemental base placed in the rear of the base-plate 2 and consisting of a circular casting divided by a partition 131. If preferred, a sheet-metal reservoir might be placed in each half of the supplemental base and each connected to one of the pipes 130. Each of these reservoirs holds, for instance, thirty times the amount of air that either of the cylinders contains, and being directly connected with the cylinders when the valves 105 are operated the compressed air fills both the cylinders and their respective reservoirs and at the same time moves out the cylinder-pistons. The practical effect from the addition of these reservoirs is the same as increasing about thirty times the size of the cylinders 111, and it therefore takes a much longer time to force the air out of the cylinders when the reservoirs are connected to them than it would if such reservoir were not used. If the reservoirs were not used, the disorder-alarm whistle would probably be sounded with cylinders of the size of those shown in the accompanying drawings nearly all of the time when the speed of the train was less than eight or ten miles an hour, as the cylinders are not large enough to hold a sufficient volume of air to prevent the exhausting of the air from the cylinders by the action of the springs 119 in a less time than the intervals or pulsations through the operation of the valves 105 by the alternating action of the cams. With the addition of the reservoirs connected to the cylinders the air cannot be exhausted from the cylinders between the periods of the opening of the valves even if the train is running at a slow rate of speed, as frequently occurs when starting out from a station or climbing steep grades.

For the purpose of shifting the sleeve 49 and the gears 51 and 52, carried thereby, so as to change the direction of travel of the hand when desired, I provide a rod 131', which passes through the bearing 47 in front of the shaft 13. On the inner end of the rod 131' is a yoke 132, which engages a groove in the hub of the gear 51. A spring 133 surrounds the rod 131' and bears at one end against the bearing 47 and at the other against the yoke 132, and this spring tends to hold the gear 51 at all times in engagement with the gear 53. A latch 134 is arranged in connection with the outer end of the rod 131', and said rod is also provided with a knob 135. When it is desired to shift the direction of travel of the hand, the engineer pulls out the knob 135 against the tension of the spring until the hub of the miter-gear 51 strikes against the collar 48, which measures the distance the miter and sleeve must be shifted to free the gear 51 from the gear 53 and to bring the gear 52 into mesh with the gear 53. The parts are locked in this position by the latch 134, which is dropped behind the shoulder of the knob, as indicated by dotted lines in Fig. 5. By lifting the latch 134 the spring 133 will automatically shift the parts back to the position shown in Fig. 4 of the drawings. When it is desired to set the hand back to zero, as at the beginning of a run, the worm 62 is forced out of engagement with the worm-wheel 16 by the means already described, and the hand may then be turned freely in either direction.

The oil-reservoir 136 is similar to that shown and described in my patent of January 3, 1899, being provided with a mouthpiece for filling and with a screw-cap for covering said mouthpiece. From this reservoir I carry a tube 137 to the end or the driving-shaft 13 and another tube 139 to the end of the worm-shaft 62. These shafts when the machine is in use both stand vertically, and the oil which drips on the upper ends of said shafts will find its way to all of the working parts which require lubricating.

For connecting the shaft 13 with the driving or running gears of a locomotive or car, I employ a similar arrangement to that shown in my patent of January 3, 1899, except that back in the cab and extending from the machine to the pulley placed above the axle from which the device is operated I use an ordinary flexible coiled shaft 140, placed in a tube 141, which may be bent at whatever angle may be required to make the connection. The signal device requires so little power to operate its working parts that a coiled shaft may be used with safety, and I thereby avoid using several knuckles or beveled gears in making the connection. The shaft 140 is provided with a worm 142, that engages a worm-gear on a short shaft 143, carrying a pulley 144. Said shaft is suitably mounted on the engine-frame and a split or halved pulley 145 is clamped upon the axle just inside of the truck. A belt 147 runs from the pulley 145 to the pulley 144.

The graduations and figures on the small dial indicate mileage, as in my other patents, but these graduations and figures are here intended to be used only for setting the triggers and not to read the indicated travel of the train. The hand in the present device does not point to or indicate the distance on the small dial, because it revolves over this dial, and therefore obscures two or three of the graduations which happen to be underneath. The engineer will read the indicated mileage from the large dial, to which the hand at all times points directly, and he will do so no matter whether he is traveling over the first, second, or third hundred miles of his run. This is no inconvenience and cannot lead to any confusion or mistake, as the engineer knows at all times whether he is in the first, second, or third hundred miles of his run.

It will be noticed that plugs or nipples are shown in all of the valves, and their purpose is to facilitate the proper boring out of the valve-chambers and the assembling of the valve parts and the connecting of the air-tubes, and also to afford guides for the valve stems or plungers to steady their motion, so as to give them the same seating every time they are operated.

The body for the air-brake valve may be cast integrally with the base-plate 2 in order to facilitate cheap, rapid, and accurate manufacture, and to render impossible in making connections with the train-pipe to break, loosen, or injure the valve or its fastenings by use of the pipe-wrenches or by other means.

I deem it unnecessary to point out in detail the operation of the machine as a whole, as the complete operation will be readily understood by those skilled in the art from the foregoing detail description of the construction and operation of the parts of the mechanism.

It will be understood that I do not limit myself to the details of the construction herein shown and described, and it will be obvious that many of the parts may be modified or equivalents substituted therefor without departing from my invention.

Having thus described my invention, I claim as new and desire to secure by Letters Patent—

1. In a train-order signal, the combination, with a movable hand, and means for moving said hand, of the graduated dials over which said hand travels, the series of triggers arranged between said dials and adapted to be engaged with the edge of the outer dial, and a signal-releasing bolt or catch carried by said hand and adapted to be operated by the passage of said hand over any trigger that is in engagement with the edge of the dial, substantially as described.

2. In a train-order signal, the combination, with a movable plunger by which the signal is brought into operation, a traveling hand, and a latch or bolt upon said hand adapted to engage said plunger and hold the same out of operation, for the purpose set forth.

3. In a train-order signal, the combination, with the movable plunger 19 and its operating-spring 21, of the movable hand provided with a catch or bolt adapted to engage said plunger, and hold it from movement against the tension of said spring while said hand is moving, for the purpose set forth.

4. In a train-order signal, the combination, with the movable plunger 19 and its operating-spring 21, of the movable hand, the dials, means for moving said hand over said dials, and a catch or bolt carried by said hand and adapted to engage and hold said plunger while said hand is being moved over said dial, for the purpose set forth.

5. In a train-order signal, the combination, with the dials, the triggers arranged in connection with one of said dials, a movable hand, means for moving said hand over said dial, a signal mechanism, a plunger adapted to operate said mechanism, and a catch or bolt carried by said hand and adapted to engage and hold said plunger, for the purpose set forth.

6. In a train-order signal, the combination, with the dials 5 and 7, of the movable hand and the series of triggers arranged between said dial and adapted to be engaged with the edge of one of said dials, for the purpose set forth.

7. In a train-order signal, the combination, with the dials 5 and 7, of the series of pivoted dogs arranged between said dials, a signal-releasing device, a movable hand by which said signal-releasing device is carried, and means for causing said signal-releasing device to be operated whenever said hand passes over a trigger that is in engagement with one of said dials, for the purpose set forth.

8. In a train-order signal, the combination, with the signal-operating valve and its operating-lever, of a movable plunger adapted to engage said lever, a spring for moving said plunger, a movable hand, and a bolt or catch carried by said hand and adapted to engage said plunger and to hold the same while said hand is being moved, for the purpose set forth.

9. In a train-order signal, the combination, with the casing, the central standard and the rotating hollow shaft 14, of the dial 5 secured to the front of the casing, the ring or hollow standard 6 arranged upon said dial, and the dial 7 arranged upon said ring, and means for securing said dials and rings to the casing, for the purpose set forth.

10. The combination, with the hollow central standard 12, the plunger mounted in said standard, the signal-releasing valve adapted to be operated by said plunger, a spring for moving said plunger, and means for holding and releasing said plunger, for the purpose set forth.

11. In a train-order signal, the combination, with the dial 7 of the shoes 34 pivoted upon the back side of said valve, the spring-actuated triggers mounted upon said shoes, provided with the lugs 39 and with the loops 41, substantially as described.

12. In a train-order signal, the combination, with the dial 7, of the shoe 34 pivoted upon said dial and provided with the bearings 36 and 37, one of said bearings having a slot therein, the trigger 38 mounted in said bearings and adapted to move in said slot, a spring engaging said triggers, and a lug 39 carried by said trigger and adapted to engage said dial, for the purpose set forth.

13. The combination, with the dial 7 and the pivoted shoe 34, of the trigger 38 having the loop 41 provided with sharp edges for the purpose set forth.

14. In a train-order signal, the combination, with the movable hand 17, of the sliding bolt 31 provided with the double lug 42' having the double inclined surface 43 and the inclined surface 44, substantially as described.

15. The combination, with the hand 17, of the sliding bolt 31 mounted in bearings upon said hand, the button 33 upon said bolt, and the spring 35 engaging said bolt, for the purpose set forth.

16. In a train-order signal, the combination, with a valve controlling the escape of air from the train-pipe to an exhaust-chamber, of a puppet-valve, and a signal-whistle, both connected to said exhaust-chamber, and means for operating said valve, whereby when said valve is partially opened the air entering said chamber from the train-pipe will pass to and will operate said signal, and when said valve is fully opened said puppet-valve will open, permitting the escape of air through said valve, the reduction of pressure in the train-pipe and thereby the setting of the train-brakes, substantially as described.

17. The combination, with the exhaust-chamber, of the puppet-valve provided with the adjustable follower 81, having the openings 82, the cap 83 provided with the opening 84, and the adjustable plate 85, for the purpose set forth.

18. In a train-order signal, the combination, with the air-valve 72, of the bell-crank lever 69 engaging said valve, and the movable plunger engaging said lever, and means for permitting first a partial opening and then a complete opening of said valve, for the purpose set forth.

19. In a train-order signal, the combination, with the train-pipe, the exhaust-chamber 73 and the movable valve 72, of the whistle connected to said exhaust-chamber, a lever engaging said valve, and means for first partially opening said valve and then completely opening it, for the purpose set forth.

20. In a train-order signal, the combination, with the air-valve, and the lever for moving said valve, provided with a series of worm-grooves, of the shaft, the worm 66 slidably mounted upon said shaft, and means for forcing said lever into engagement with said worm, for the purpose set forth.

21. The combination, in a train-order signal, with the air-valve and the lever for moving said valve, provided with a series of worm-grooves, of the movable worm 66, and means for forcing said lever into engagement with said worm, for the purpose set forth.

22. The combination, with the air-valve and its operating-lever 69, of the shaft 13, the worm 66 slidably mounted upon said shaft, and the spring 66' arranged upon said shaft upon opposite sides of said worm, for the purpose set forth.

23. The combination, in a train-order signal, with the air-valve 72, of the pivoted lever 69 engaging said valve, and provided with a series of worm-grooves, the plunger 19 provided with the spring 21 adapted to move said plunger into contact with said lever, the worm 66 slidably mounted upon the driving-shaft 13, and suitable springs for holding said worm normally in a central position on said lever, and means for holding and releasing said plunger, whereby as said plunger is moved by its spring said air-valve will be slightly opened and said lever will be brought into engagement with said worm, and after a short interval said worm will move from the engagement with said lever and permit said valve to be farther opened, for the purpose set forth.

24. In a train-order signal, the combination, with the movable hand, the hollow-shaft 14 and the worm 16, of the worm-shaft 58 engaging said worm-wheel, and movable bearings in which said worm-shaft is mounted, substantially as described.

25. The combination, in a train-order signal, with the driving-shaft 13, of the movable sleeve 49 secured upon said driving-shaft by a spline or feather and slidable thereon, the yoke 132 engaging said sleeve, the gears 51 and 52 mounted upon said sleeve and adapted to engage the gear 53, and means for moving said yoke, for the purpose set forth.

26. In a train-order signal, the combination, with the driving mechanism, of a disorder alarm or signal, and independent pneumatically-controlled automatic connections that prevent the operation of said signal except upon the stoppage of said driving mechanism, substantially as described.

27. The combination, with a driving-shaft, of a disorder alarm or signal, and a plurality of controlling members either one of which causes the operation of said disorder alarm or signal upon the stopping of said shaft, substantially as described.

28. The combination, with a driving-shaft, of a disorder alarm or signal, and a plurality of controlling members operated by said shaft and either member arranged to operate said disorder alarm or signal on the stopping of said shaft.

29. The combination, with a driving-shaft, of a disorder alarm or signal, a plurality of pneumatic cylinders provided with pistons, automatic means for operating said alarm by the movement of either of said pistons, and valves controlled by the movement of said shaft and controlling the admission of air to said cylinders, for the purpose set forth.

30. The combination, with a driving-shaft, of a disorder alarm or signal, a pneumatic controlling-cylinder, and an auxiliary or storage reservoir in open connection with said cylinder, for the purpose set forth.

31. The combination, with the disorder-alarm, of the controlling-cylinders provided with pistons 117, piston-rods 118 and springs 119, the movement of said rods adapted to operate said alarm, of the twin valves controlling admission of air to said cylinders, and means for operating said valves.

32. The combination, with a driving-shaft, of a disorder alarm or signal, a plurality of pneumatic cylinders controlling the operation of said alarm, twin valves periodically operated by said shaft and controlling the admission of air to said cylinders, and means for forcing the air from said cylinders and operating said disorder-alarm upon the stopping of said shaft.

33. The combination, with a driving-shaft, of a disorder-alarm, a valve controlling said alarm, a plurality of pneumatic cylinders, having pistons either of which is adapted to operate said valve, springs for moving said pistons and thereby operating said valve, and means operated by said shaft and controlling the admission of air to said cylinders to limit the movement of said pistons.

34. The combination, with the disorder-alarm, and the controlling-cylinders 111, of the twin valves 105, governing the admission of air to said cylinders, and means for alternately operating said valves, for the purpose set forth.

In testimony whereof I have hereunto set my hand this 19th day of January, 1900.

HARRY DE WALLACE.

In presence of—
FRANCIS N. FITCH,
LUCILLE R. BARON.